US011542968B2

United States Patent
Wang et al.

(10) Patent No.: US 11,542,968 B2
(45) Date of Patent: Jan. 3, 2023

(54) DEFLECTOR DISC OF DISC TUBE MEMBRANE MODULE

(71) Applicants: UNISOL Membrane Technology (Xiamen) Co., Ltd., Xiamen (CN); Xiamen Jiarong Technology Corp., Ltd., Xiamen (CN); Xiamen University of Technology, Fujian (CN)

(72) Inventors: Rushun Wang, Fujian (CN); Zhiqun Yuan, Fujian (CN); Jing Zhou, Fujian (CN); Bin Yan, Fujian (CN); Zhipeng Ma, Fujian (CN); Tingliang Zhong, Fujian (CN)

(73) Assignees: UNISOL Membrane Technology (Xiamen) Co., Ltd.; Xiamen Jiarong Technology Corp., Ltd.; Xiamen University of Technology

( * ) Notice: Subject to any disclaimer, the term of this patent is extended or adjusted under 35 U.S.C. 154(b) by 419 days.

(21) Appl. No.: 16/746,037

(22) Filed: Jan. 17, 2020

(65) Prior Publication Data
US 2021/0095703 A1    Apr. 1, 2021

(30) Foreign Application Priority Data

Sep. 26, 2019   (CN) .......................... 201910915618.3

(51) Int. Cl.
| | |
|---|---|
| *F15D 1/00* | (2006.01) |
| *B01D 63/06* | (2006.01) |
| *B01D 61/02* | (2006.01) |
| *B01D 61/08* | (2006.01) |

(52) U.S. Cl.
CPC ........... *F15D 1/0035* (2013.01); *B01D 61/02* (2013.01); *B01D 61/08* (2013.01); *B01D 63/06* (2013.01); *B01D 63/062* (2013.01)

(58) Field of Classification Search
CPC ....... F15D 1/0035; B01D 61/02; B01D 61/08; B01D 63/06; B01D 63/062
USPC ........................................................ 138/39
See application file for complete search history.

(56) References Cited

FOREIGN PATENT DOCUMENTS

| CN | 202741008 U | * | 2/2013 |
| CN | 206391882 U | * | 8/2017 |
| CN | 207546243 U | * | 6/2018 |

* cited by examiner

*Primary Examiner* — Robert A Hopkins
*Assistant Examiner* — Qianping He
(74) *Attorney, Agent, or Firm* — Lerner, David, Littenberg, Krumholz & Mentlik, LLP

(57) ABSTRACT

Disclosed is a deflector disc of a disc tube membrane module, including a deflector disc body, radial water distribution ribs, an inner support ring and an outer support ring. Bulges are arranged on the front and back sides of the deflector disc body; first and second ends of the radial water distribution rib are respectively fixedly connected with an inner edge of the deflector disc body and an outer edge of the inner support ring, an annular boss is arranged on the front side of the inner support ring, a seal ring groove is respectively arranged at corresponding positions of the front and back sides of the inner support ring, multiple yielding water collecting grooves are annularly and uniformly distributed on the inner surface of the inner support ring; an inner edge of the outer support ring is fixedly connected with an outer edge of the deflector disc body.

9 Claims, 5 Drawing Sheets

DEFLECTOR DISC OF DISC TUBE MEMBRANE MODULE

TECHNICAL FIELD

The present invention relates to the technical field of disc tube membrane modules, and in particular to a deflector disc of a disc tube membrane module.

BACKGROUND

A disc tube membrane module breaks through limitation to application of the traditional spiral-wound membrane module in an unique open type flow channel design manner and is widely applied to various wastewater with high concentration of salt, ammonia nitrogen, organic matters, suspended matters in the industries of landfill leachate, power plant desulfurization, coal chemicals and the like. Recently, with the increasingly application requirements of near zero liquid discharge, applicability of a disc tube reverse osmosis system is required to be wider and wider, and to purchase a recovery ratio of the system, requirements on pressure resistance of the disc tube membrane module are higher and higher.

A deflector disc is a core component of the disc tube membrane module, and is used for fixing and limiting a membrane and also defining a turbulence effect of a membrane surface, the turbulence effect directly influences anti-fouling performance of the membrane module, and a structure of the deflector disc also decides a sealing effect of the deflector disc and the membrane under high pressure.

A resisted pressure of a common disc tube reverse osmosis module generally is within 9.0 MPa, but in actual application, an operation pressure is required to reach 16.0 MPa to purchase a higher concentration times, so, higher requirements on the strength, the sealing effect and the turbulence effect of the deflector disc are put forward.

SUMMARY

An objective of the present invention is to provide a deflector disc of a disc tube membrane module, which resists high pressure, has a forced turbulence function and improves anti-fouling performance of the membrane module.

To achieve the above purpose, the present invention provides the following technical solution.

A deflector disc of a disc tube membrane module includes:

a deflector disc body, where bulges are arranged on the front side and back side of the deflector disc body, the multiple bulges are annularly and uniformly distributed with the center of the deflector disc body as the center of a circle, there are the same cycle numbers of the bulges on the front side and the back side of the deflector disc body, and diameters of the cycles of the bulges are mutually corresponding;

radial water distribution ribs, where multiple radial water distribution ribs are annularly and uniformly distributed with the center of the deflector disc body as the center of a circle, a water distribution groove is formed between two adjacent water distribution ribs, and a first end of each radial water distribution rib is fixedly connected with an inner edge of the deflector disc body;

an inner support ring, where a second end of each radial water distribution rib is fixedly connected with an outer edge of the inner support ring, an annular boss is arranged on the front side of the inner support ring, a seal ring groove is respectively arranged at corresponding positions of the front side and back side of the inner support ring, an outer side groove wall of the seal ring groove is sawtooth-shaped, the seal ring groove is located on an outer side of the annular boss, multiple yielding water collecting grooves are annularly and uniformly distributed on the inner surface of the inner support ring, the yielding water collecting grooves are axial through grooves, the depth of the yielding water collecting groove is greater than the width of the annular boss, locating pins are arranged on the front side of the annular boss, and locating holes are arranged on the back side of the annular boss and are used for allowing insertion of the locating pins; and an outer support ring, where an inner edge of the outer support ring is fixedly connected with an outer edge of the deflector disc body, and the inner support ring, the outer support ring, the deflector disc body, the annular boss and the seal ring grooves are concentric.

Preferably, there are six yielding water collecting grooves which are uniformly distributed in a circumferential direction of the inner surface of the inner support ring.

Preferably, the number of the bulges on the front side of the deflector disc body is greater than the number of the bulges on the back side of the deflector disc body.

Preferably, the bulge has a shrinkage structure from the bottom to the top, the bottom of the bulge and the deflector disc body are in arc transition, and the top of the bulge is a curved surface.

Preferably, the inner support ring and the outer support ring have the same thickness, and the back side of the inner support ring is coplanar with the back side of the outer support ring.

Preferably, the thicknesses of the outer support rings on two sides of the deflector disc body are the same.

Preferably, positions of the locating holes on the annular boss integrally differ 180 degrees from positions of the locating pins on the annular boss, a first location indicating structure and a second location indicating structure are arranged on an outer side face of the outer support ring, a connecting line of the first location indicating structure and the second location indicating structure is in a diameter direction of the outer support ring and is collinear with a connecting line of two yielding water collecting grooves, and the first location indicating structure and the second location indicating structure have different structures.

Preferably, a structure of the first location indicating structure has a bump while a structure of the second location indicating structure has three bumps.

Preferably, the innermost cycle of the bulges on the front side and the back side of the deflector disc body and the corresponding radial water distribution ribs have the same position angles.

Preferably, there are two position relations of each cycle of the bulges on the front side and the back side of the deflector disc body and the radial water distribution ribs; one position relation is: any bulge of the cycle and one radial water distribution rib have the same position angle, and the other position relation is: any bulge of the cycle is located on a central surface of the water distribution groove; and the two position relations are distributed alternatively.

The present invention achieves the following technical effects compared with the prior art:

by arranging the seal ring groove having the sawtooth-shaped outer side groove wall, the present invention effectively absorbs deformation of the seal ring and also exerts a great protection function to ensure reliability of the seal under high pressure; a bulge distribution manner of the present invention exerts an excellent turbulence scouring effect to the membrane to prolong a contamination cycle of the membrane and improve anti-fouling performance such that the membrane module can work under the most severe water intake condition; and the deflector disc of a disc tube membrane module of the present invention has high tolerance pressure, and a seal pressure can be more than 25.0 MPa by testing.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

Description of reference signs: 1—deflector disc body, 2—radial water distribution rib, 3—inner support ring, 4—outer support ring, 5—seal ring groove, 6—locating pin, 7—locating hole, 8—axial through groove, 9—water distribution groove, 10—bulge, 11—first location indicating structure, 12—second location indicating structure, 13—membrane, and 14—seal ring, 15—annular boss.

DETAILED DESCRIPTION OF EMBODIMENTS

The following clearly and completely describes the technical solutions in the embodiments of the present invention with reference to accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

An objective of the present invention is to provide a deflector disc of a disc tube membrane module, which resists high pressure, has a forced turbulence function and improves anti-fouling performance of the membrane module.

In order to make the above objects, features, and advantages of the present invention more apparent, the present invention will be further described in detail in connection with the accompanying drawings and the detailed description.

Figure 1:
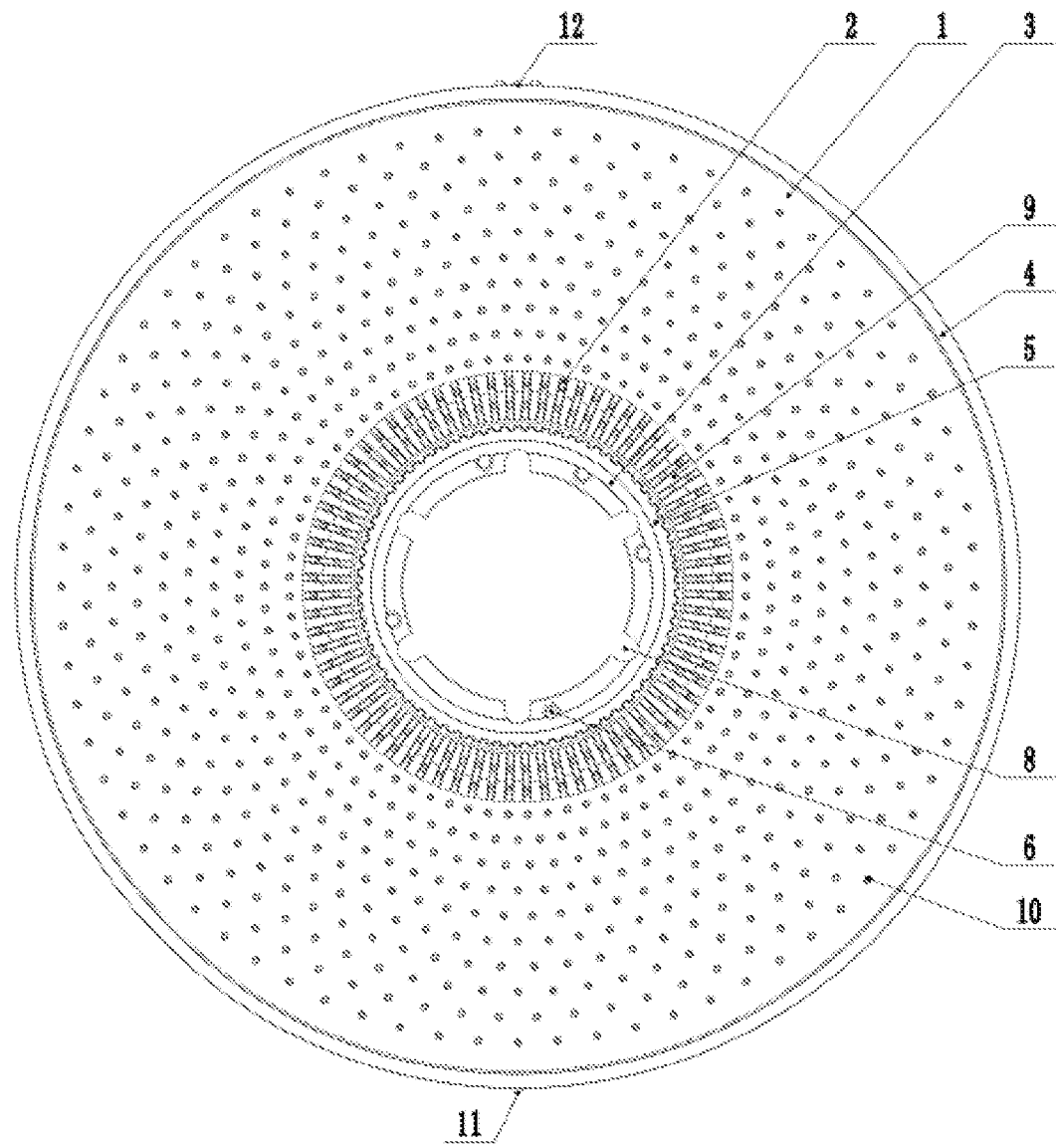
FIG. 1 is a schematic diagram of the front side structure of a deflector disc of a disc tube membrane module in an embodiment.
Figure 2:
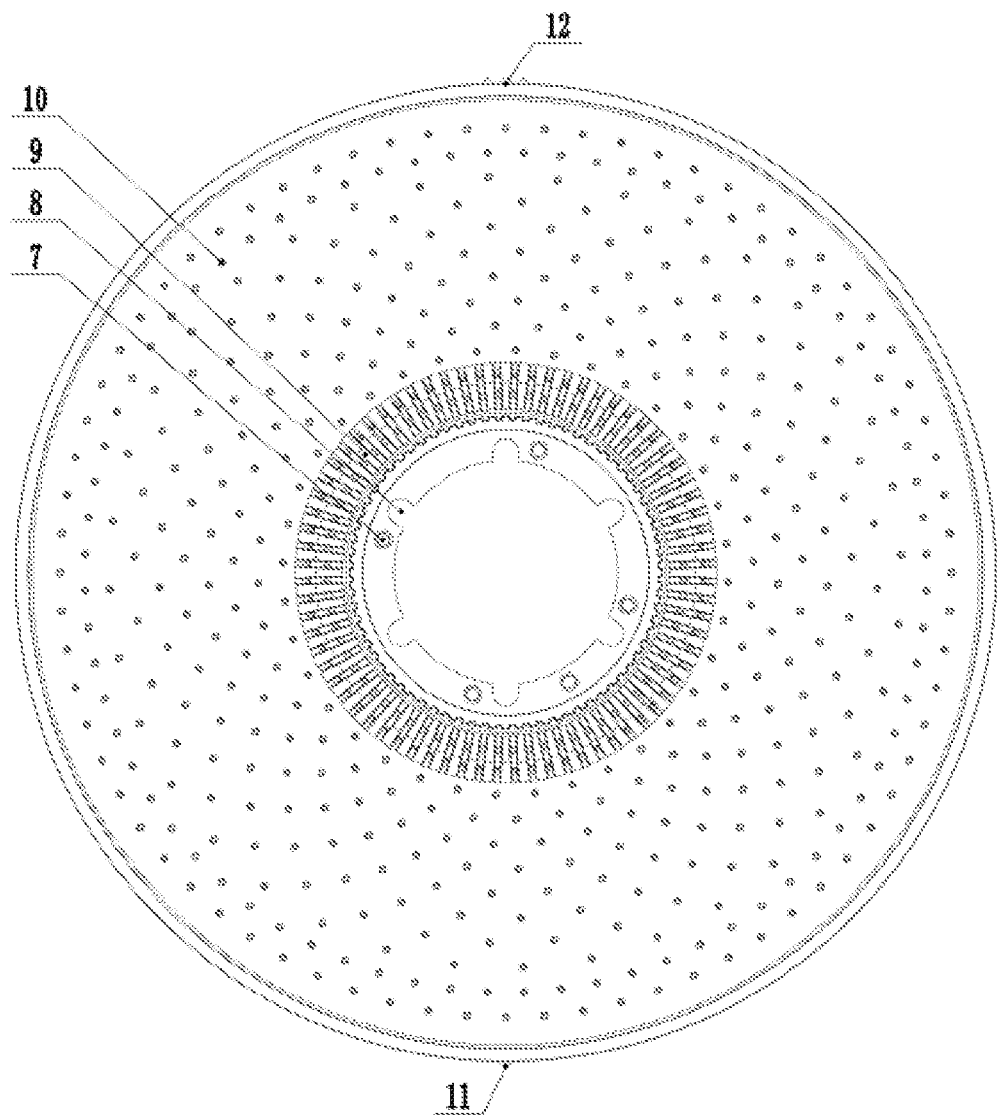
FIG. 2 is a schematic diagram of the back side structure of a deflector disc of a disc tube membrane module in an embodiment.
Figure 3:
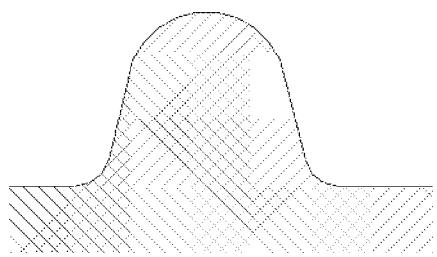
FIG. 3 is a schematic structural diagram of a bulge.
Figure 4:
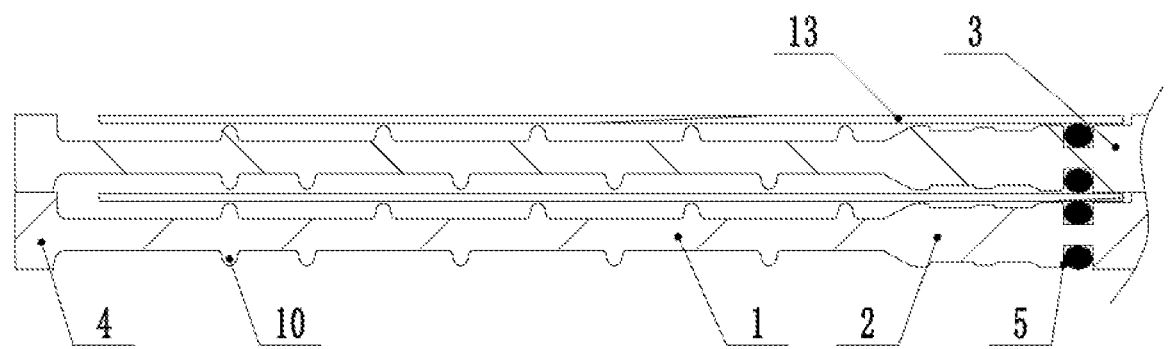
FIG. 4 is a sectional view of a partial structure after seal rings and a membrane are assembled on a deflector disc of a disc tube membrane module in an embodiment.
Figure 5:
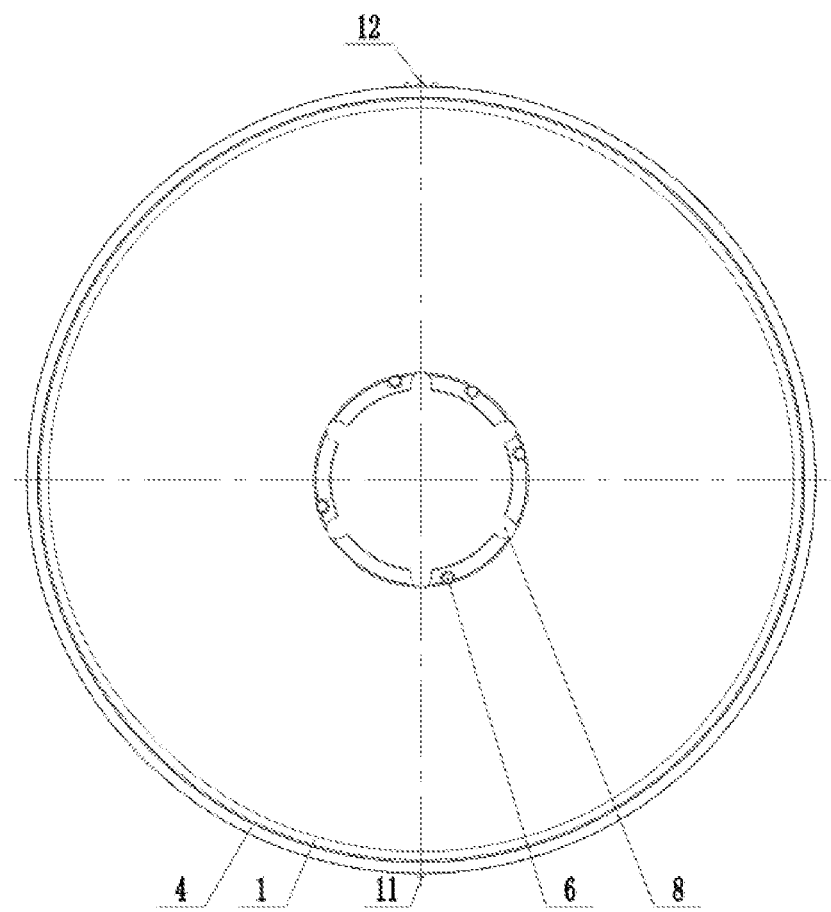
FIG. 5 is a schematic diagram of the front side structure after a membrane is mounted on a deflector disc of a disc tube membrane module in an embodiment.
Figure 6:
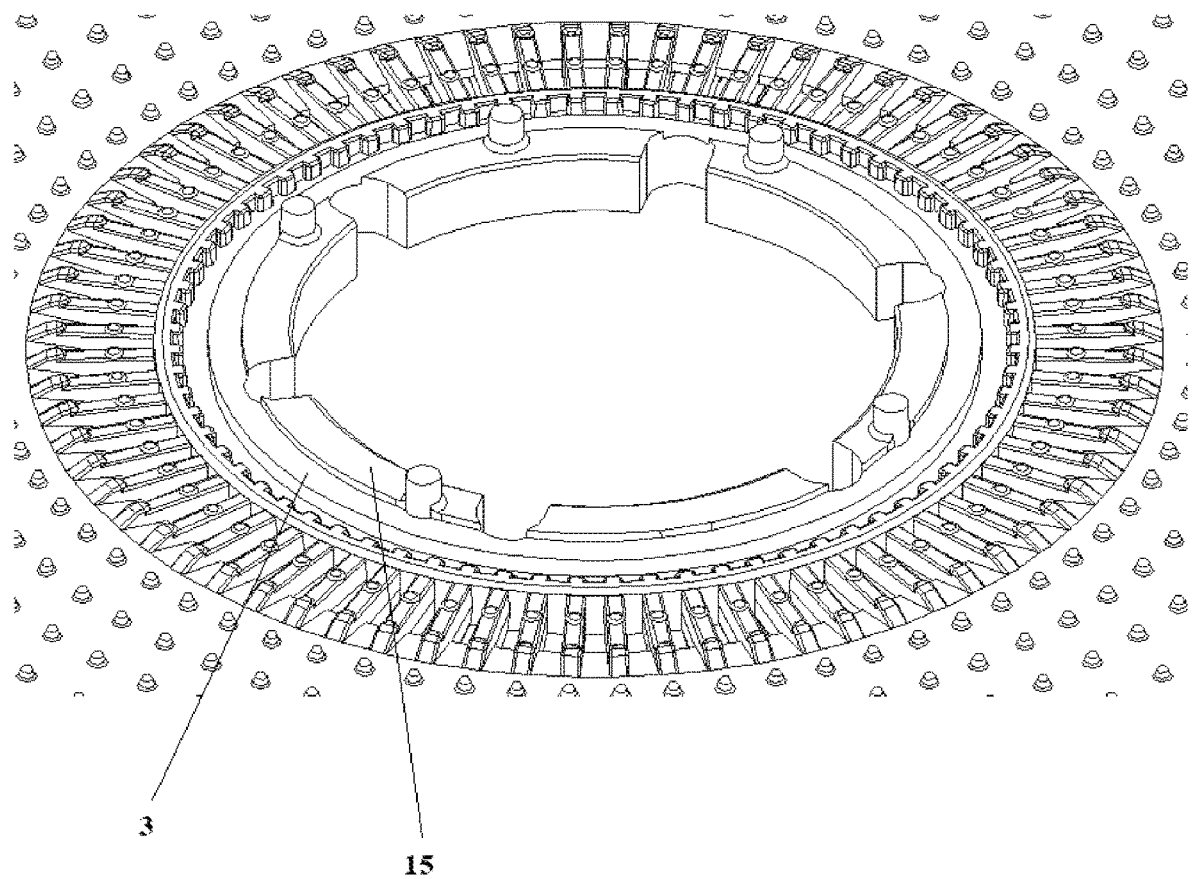
FIG. 6 is a three-dimensional schematic diagram of the front side structure of a deflector disc of a disc tube membrane module in an embodiment.
Figure 7:
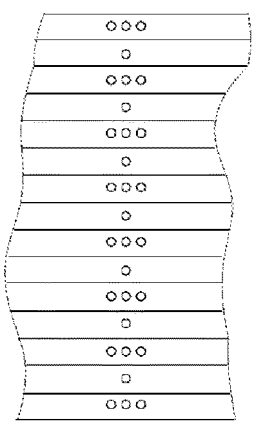
FIG. 7 is a schematic diagram showing an overlaying effect after multiple deflector discs of disc tube membrane modules in an embodiment are assembled.
Figure 8:
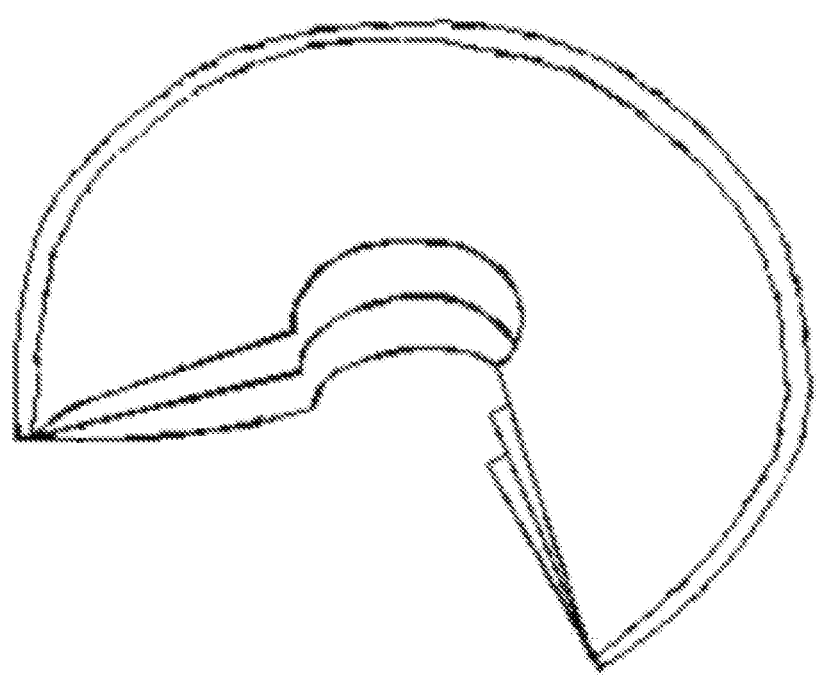
FIG. 8 is a schematic structural diagram of a membrane.

As shown in FIG. 1 to FIG. 8, the embodiment provides a deflector disc of a disc tube membrane module, including a deflector disc body 1, radial water distribution ribs 2, an inner support ring 3 and an outer support ring 4.

Where bulges 10 are arranged on the front side and back side of the deflector disc body 1, the multiple bulges 10 are annularly and uniformly distributed with the center of the deflector disc body 1 as the center of a circle, there are the same cycle numbers of the bulges 10 on the front side and the back side of the deflector disc body 1, and diameters of the cycles of the bulges are mutually corresponding. When a feed liquid flows on the front side and the back side of the deflector disc body 1, the bulges 10 can achieve a turbulence function so as to achieve an effect of cleaning the deflector disc body 1 and a membrane 13. After the membrane 13 is mounted between two adjacent deflector discs of the disc tube membrane modules, the diameters of the cycles of the bulges 10 on the front side and the back side of the deflector disc body 1 are the same such that the bulges 10 on the front side and the back side of the deflector disc body 1 achieve a limiting function to the membrane 13 and can prevent damage of the membrane 13 caused by the fact that the membrane 13 generates a great displacement under the action of turbulence. In the embodiment, the number of the bulges 10 on the front side of the deflector disc body 1 is greater than the number of the bulges 10 on the back side of the deflector disc body 1. To prevent the membrane from damaging when the membrane 13 is in contact with the bulges 10, each bulge 10 of the embodiment has a shrinkage structure from the bottom to the top, the bottom of the bulge 10 and the deflector disc body 1 are in arc transition, and the top of the bulge 10 is a curved surface.

Multiple radial water distribution ribs 2 are annularly and uniformly distributed with the center of the deflector disc body 1 as the center of a circle, a water distribution groove 9 is formed between two adjacent water distribution ribs, and a first end of each radial water distribution rib 2 is fixedly connected with an inner edge of the deflector disc body 1. The feed liquid can flow to the next stage of the deflector disc of the disc tube membrane module through the water distribution grooves 9 to be subsequently filtered.

A second end of each radial water distribution rib 2 is fixedly connected with an outer edge of the inner support ring 3, and an annular boss 15 is arranged on the front side of the inner support ring 3. The height of the annular boss 15 cannot be greater than the thickness of the membrane 13 to ensure that the membrane 13 is not damaged by the deflector discs of the disc tube membrane modules on an upper side and a lower side in a pressing manner during assembly. A seal ring groove 5 is respectively arranged at corresponding positions of the front side and back side of the inner support ring 3 and is used for accommodating a seal ring 14. During assembly, the membrane 13 is not directly fixed by the inner support ring 3, and the membrane 13 is sandwiched between a seal ring 14 mounted on the front side of one deflector disc of the disc tube membrane module and a seal ring 14 mounted on the back side of another deflector disc of the disc tube membrane module. The membrane 13 shows a natural state in an area limited by same-diameter circles formed by the bulges 10 on upper and lower deflector discs of disc tube membrane modules from the center to the circumference.

An outer side groove wall of the seal ring groove 5 is sawtooth-shaped while an inner side groove wall thereof is a cylindrical surface. When the seal ring 14 is mounted in the seal ring groove 5, the seal ring 14 is pressed to deform under an external torque action, the seal ring 14 is filled in saw teeth to increase a contact area of the seal ring 14 and the seal ring groove 5 such that the seal ring 14 is hard to slide off under high pressure, thereby improving sealing performance of the seal ring 14 under high pressure. The width and the depth of a sawtooth-shaped structure of the outer side groove wall are proper if a deformation degree of the seal ring 14 is completely accommodated. When high-pressure water flow of the water distribution grooves 9 flush towards the seal ring 14, the seal ring 14 is filled in the sawtooth-shaped groove such that the seal ring 14 in the seal ring groove 5 is greatly protected. Therefore, by arranging the seal ring groove 5 having the sawtooth-shaped outer side groove wall, the present invention effectively absorbs deformation of the seal ring 14 and also exerts a great protection function to ensure reliability of the seal under high pressure.

The membrane 13 is formed by two concentric annular reverse osmosis membranes, and a layer of supporting net is sandwiched between the two reverse osmosis membranes such that yielding water passing through the membrane 13 can quickly flow to an outlet. Outer circumferences of such three layers of annular materials are welded by utilizing an ultrasonic technology, and a hole is opened in the center and is a yielding water outlet. The seal ring groove 5 is located on an outer side of the annular boss 15, multiple yielding water collecting grooves are annularly and uniformly distributed on the inner surface of the inner support ring 3, the yielding water collecting grooves are axial through grooves 8, and the yielding water collecting grooves pass through the annular boss 15 in a radial direction. The yielding water flows to the axial through grooves 8 along the supporting net at the center of the membrane, the seal ring 14 in the seal ring groove 5 prevents the feed liquid from entering the axial through grooves 8, and the yielding water of the axial through grooves 8 is finally gathered, collected and discharged. In the embodiment, there are six yielding water collecting grooves which are uniformly distributed in a circumferential direction of the inner surface of the inner support ring 3.

To help location and mounting of two adjacent deflector discs of the disc tube membrane modules, locating pins 6 are arranged on the front side of the annular boss 15 in the embodiment while the back side of the annular boss 15 is provided with locating holes 7 allowing insertion of the locating pins 6, and the two adjacent deflector discs of the disc tube membrane modules are located in a pin-hole manner.

Specifically, in the embodiment, there are five locating pins 6, corresponding central angles of the every two adjacent locating pins 6 sequentially are 45 degrees, 45 degrees, 90 degrees, 90 degrees and 90 degrees clockwise. In the embodiment, there are five locating holes 7, corresponding central angles of the every two adjacent locating holes 7 sequentially similarly are 45 degrees, 45 degrees, 90 degrees, 90 degrees and 90 degrees clockwise. However, positions of the five locating holes 7 on the annular boss 15 integrally differ 180 degrees from positions of the five locating pins 6 on the annular boss 15.

In order to help for aligning and counting, a first location indicating structure 11 and a second location indicating structure 12 are arranged on an outer side face of the outer support ring 4, a connecting line of the first location indicating structure 11 and the second location indicating structure 12 is in a diameter direction of the outer support ring 4 and is collinear with a connecting line of two yielding water collecting grooves, and the first location indicating structure 11 and the second location indicating structure 12 have different structures. A structure of the first location indicating structure 11 has a bump while a structure of the second location indicating structure 12 has three bumps. After the locating pins 6 are inserted into the locating holes 7, the first location indicating structure 11 and the second location indicating structure 12 of the upper and lower deflector discs of the disc tube membrane modules are mounted in an interlaced manner.

An inner edge of the outer support ring 4 is fixedly connected with an outer edge of the deflector disc body 1, and the inner support ring 3, the outer support ring 4, the deflector disc body 1, the annular boss 15 and the seal ring grooves 5 are concentric. A sunken part is formed on the front side of the deflector disc body and between the outer support ring 4 and the annular boss 15, and is used for accommodating the membrane 13, that is, the outer diameter of the membrane 13 is less than the inner diameter of the outer support ring 4 while the inner diameter of the membrane 13 is greater than the outer diameter of the annular boss 15.

To ensure that the inner support ring 3 and the outer support ring 4 are uniformly stressed and do not deform when the deflector disc of the disc tube membrane module is mounted in a disc tube reverse osmosis membrane module, in the embodiment, the inner support ring 3 and the outer support ring 4 have the same thickness, the back side of the inner support ring 3 is coplanar with the back side of the outer support ring 4, and the front side of the annular boss 15 is coplanar with the front side of the outer support ring 4.

To ensure differential pressure resistance of the deflector disc of the disc tube membrane module, it is proper that the thicknesses of the outer support rings 4 on two sides of the deflector disc body 1 in the embodiment are the same such that the stress is uniform when multiple deflector discs of the disc tube membrane modules are assembled and then are tightly pressed by torque.

Furthermore, to a distribution form of the bulges 10, the innermost cycle of the bulges 10 on the front side and the back side of the deflector disc body 1 and the corresponding radial water distribution ribs 2 have the same position angles. When the feed liquid diffuses from the center to the circumference or from the circumference to the center, the feed liquid passing through the water distribution ribs can be prevented from directly flushing the bulges 10 to cause turbulent rolling of the water so as to avoid damage of the membrane 13.

Furthermore, there are two position relations of each cycle of the bulges 10 on the front side and the back side of the deflector disc body 1 and the radial water distribution ribs 2, one position relation is: any bulge 10 of the cycle and one radial water distribution rib 2 have the same position angle, the other position relation is: any bulge 10 of the cycle is located on a central surface of the water distribution groove 9, and the two position relations are distributed alternatively. Due to such bulge distribution manner, when the feed liquid flows through the deflector disc of the disc tube membrane module, the feed liquid does not flow in a straight smooth flowing manner, but no matter that the feed liquid flows from the circumference to the center of the front side of the deflector disc of the disc tube membrane module or from the center to the circumference of the back side of the deflector disc of the disc tube membrane module, flowing paths always have cycles of turbulences to flow from the bulges 10 to the membrane 13, and in such procedure, the feed liquid generates the turbulence function to the membrane 13 when flowing through the bulges 10 to continuously take away pollutants on surfaces of the membrane so as to greatly release a sedimentation effect of the pollutants on the surfaces of the membrane, so, the anti-fouling performance of the membrane 13 is greatly improved, and the membrane is suitable for worse water quality conditions.

When the deflector disc of the disc tube membrane module of the embodiment is used, the feed liquid flows out of the water distribution grooves 9 of a deflector disc of the disc tube membrane module and then is diffused from the center to the circumference of the membrane 13, sequentially flows through an upper surface of the membrane 13, turns over in the circumferential direction of the membrane 13 to reach the back side of the membrane 13, flows to the center from the circumferential direction, flows through the water distribution grooves 9 of the next deflector disc of the disc tube membrane module, and then flows through a next membrane 13. When the feed liquid flows from the center to the circumference and then from the circumference to the center, the open area of the feed liquid is changed from small to large and then from large to small, and the flow velocity of cross flow on the corresponding membrane surface is great at the center and less at the circumference. The center of the membrane 13 is fixed by the seal ring 14 and the area of the cross flow is less, so the center of the membrane 13 can bear a top flow velocity of the cross flow, the circumferential portion of the membrane 13 shows the natural state, and a less flow velocity is beneficial to reducing impact to the membrane 13 so as to ensure the service life of the membrane.

Specific embodiments are applied in this specification to describe the principle and implementations of the present invention. The description of the aforementioned embodiments is only used for facilitating understanding of the method and the core idea of the present invention; and meanwhile, for those of ordinary skills in the art, there will be changes in specific implementations and application scope in accordance with the concept of the present invention. In conclusion, the content of this specification shall not be construed as a limitation to the invention.

What is claimed is:

1. A deflector disc of a disc tube membrane module, comprising:
    a deflector disc body, wherein bulges are arranged on a front side and a back side of the deflector disc body, the bulges are radially arranged in a series of cycles from an innermost cycle to an outermost cycle, the bulges are annularly and uniformly distributed with a center of the deflector disc body as the center of a circle, there are a same cycle numbers of the bulges on the front side and the back side of the deflector disc body, and diameters of the opposite cycles of the bulges are mutually corresponding;
    radial water distribution ribs, wherein the radial water distribution ribs are annularly and uniformly distributed with the center of the deflector disc body as the center of a circle, a water distribution groove is formed between two adjacent water distribution ribs, and a first end of each radial water distribution rib is fixedly connected with an inner edge of the deflector disc body;
    an inner support ring, wherein a second end of each radial water distribution rib is fixedly connected with an outer edge of the inner support ring, an annular boss is arranged on a front side of the inner support ring, a seal ring groove is respectively arranged at corresponding positions of the front side and a back side of the inner support ring, an outer side groove wall of the seal ring groove is sawtooth-shaped, the seal ring groove is located on an outer side of the annular boss, multiple yielding water collecting grooves are annularly and uniformly distributed on an inner surface of the inner support ring, the multiple yielding water collecting grooves are axial through grooves, the depth of each of the multiple yielding water collecting grooves is greater than the width of the annular boss, locating pins are arranged on a front side of the annular boss, and locating holes are arranged on a back side of the annular boss and are used for allowing insertion of the locating pins; and
    an outer support ring, wherein an inner edge of the outer support ring is fixedly connected with an outer edge 'disc body, and the inner support ring, the outer support ring, the deflector disc body, the annular boss and each seal ring grooves are concentric,
    wherein the innermost cycle of the bulges on the front side and the back side of the deflector disc body and the corresponding radial water distribution ribs are radially aligned, and the innermost cycle of the bulges on the front side of the deflector disc body and the corresponding radial water distribution ribs are in one-to-one correspondence.

2. The deflector disc of a disc tube membrane module according to claim 1, wherein the multiple yielding water collecting grooves comprise six yielding water collecting grooves which are uniformly distributed in a circumferential direction of the inner surface of the inner support ring.

3. The deflector disc of a disc tube membrane module according to claim 1, wherein the number of the bulges on the front side of the deflector disc body is greater than the number of the bulges on the back side of the deflector disc body.

4. The deflector disc of a disc tube membrane module according to claim 1, wherein each bulge of the bulges has a shrinkage structure from a bottom to a top, the bottom of each bulge of the bulges and the deflector disc body are in arc transition, and the top of each bulge is a curved surface.

5. The deflector disc of a disc tube membrane module according to claim 1, wherein the inner support ring and the outer support ring have a same thickness in a radial direction, and the back side of the inner support ring is coplanar with the back side of the outer support ring.

6. The deflector disc of a disc tube membrane module according to claim 1, wherein in a radial direction, a thickness of the outer support ring on one sides of the deflector disc body and a thickness of the outer support ring on another side of the deflector disc body are the same.

7. The deflector disc of a disc tube membrane module according to claim 1, wherein positions of the locating holes on the annular boss integrally differ 180 degrees from positions of the locating pins on the annular boss, a first location indicating structure and a second location indicating structure are arranged on an outer side face of the outer support ring, a connecting line of the first location indicating structure and the second location indicating structure is in a diameter direction of the outer support ring and is collinear with a connecting line of two yielding water collecting grooves of the multiple yielding water collecting grooves, and the first location indicating structure and the second location indicating structure have different structures.

8. The deflector disc of a disc tube membrane module according to claim 7, wherein a structure of the first location indicating structure has a bump while a structure of the second location indicating structure has three bumps.

9. The deflector disc of a disc tube membrane module according to claim 1, wherein each cycle of the bulges on the front side and the back side of the deflector disc body and the radial water distribution ribs comprise two position relations; one position relation is: any bulge of the each cycle of the bulges and one radial water distribution rib are radially aligned, and the other position relation is: any bulge of the cycle is located on a central surface of the water distribution groove; and the two position relations are distributed alternatively.

\* \* \* \* \*